Patented July 2, 1946

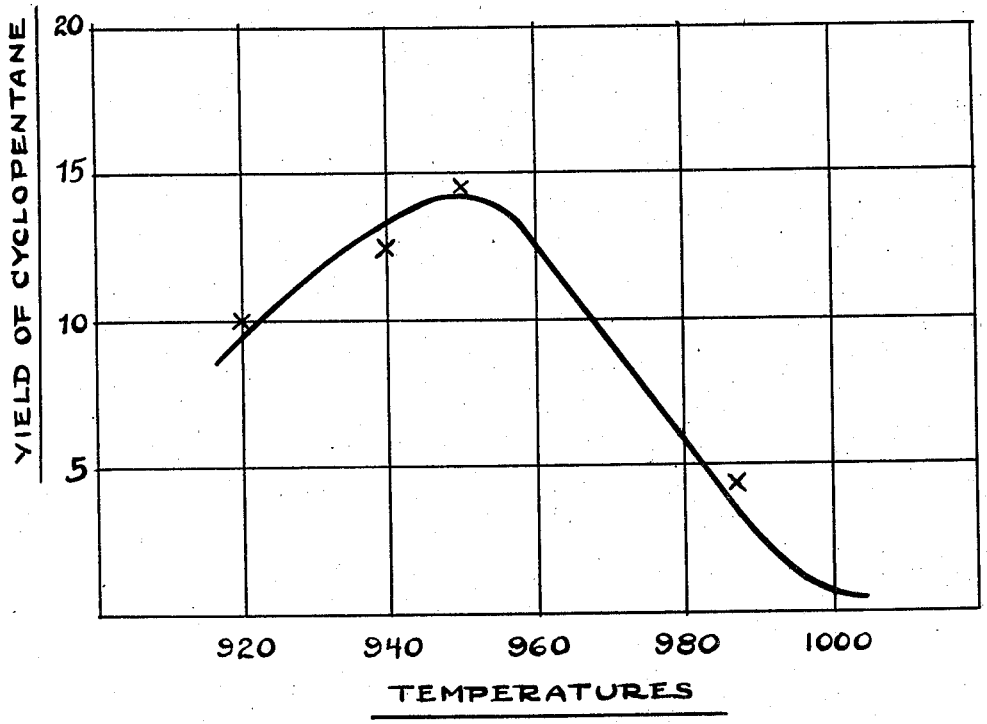

2,403,281

UNITED STATES PATENT OFFICE 2,403,281

MANUFACTURE OF CYCLOPENTANES

Ralph M. Hill and Howard G. Codet, Mountainside, N. J., assignors to Standard Oil Development Company, a corporation of Delaware Application May 29, 1943, Serial No. 489,032

6 Claims. (Cl. 260—666)

The present invention relates to improvements in the art of producing hydrocarbons boiling within the gasoline range, and more particularly, it relates to the production of cyclopentane which is a valuable blending agent in the manufacture of aviation gasoline.

Recent supercharged engine tests on various pure hydrocarbons have indicated that cyclopentane possesses unusually high anti-detonation properties and this compound has therefore become of importance in the production of high quality aviation fuels.

The main object of our present invention is to produce cyclopentane more cheaply and expeditiously than has heretofore been possible.

Our process consists essentially in subjecting alkylated cyclopentanes at pressures of from 1000–5000 lbs./sq. in. and temperatures between about 900° and 1000° F. to form cyclopentane.

In the drawing we have shown graphically, the selectivity of the dealkylation reaction with respect to weight per cent of an alkylated cyclopentane converted.

In carrying out our process, we may use any known alkylated cyclopentane, such as methyl, ethyl, propyl, butyl or dialkylated cyclopentanes.

In order to describe our invention more fully, we set forth a preferred modification thereof in the specific examples below, with the understanding that the specific details therein are purely illustrative and do not impose any limitation on our invention.

Example 1

300 cc. of methylcyclopentane (containing approximately 1% benzene) was placed in a 1.2 liter high pressure bomb. Hydrogen was then introduced to a pressure of 1700 lbs./sq. in. and the temperature raised to 960° during a period of 3½ hours. The reaction was allowed to proceed for 2½ hours at about the temperature stated. The pressure was approximately 5000 lbs./sq. in. during the reaction. At the end of this period, the product was withdrawn from the system. The following results were obtained:

| Yields, output basis: | Per cent by weight |
|---|---|
| Gas (C4 and lighter) | 27.4 |
| Pentanes | 5.5 |
| Cyclopentane | 13.7 |
| Hexanes | 1.0 |
| Methylcyclopentane recovered | 42.7 |
| Bottoms | 9.7 |
| Coke | <0.1 |
| Material balance | 92.1 |
| Cyclopentane+methane equiv | 16.8 |
| Selectivity | 29.4 |

Example 2

A second test run was conducted under the same conditions set forth above except a temperature was maintained at 850° for 5 hours. No evidence of cyclopentane in the product was obtained.

Example 2 shows that at 850° F. no reaction took place. Other tests showed that above 980° excessive coke and gas were formed. Our tests showed that the dealkylation of alkylated cyclopentane was a reaction which operated best at temperatures in the range of from about 900° F. to 980° F. This range is critical and good results are not obtainable above and below it. Furthermore, our process operates about equally well whether or not a dealkylation catalyst is employed. In other words, there is no particular advantage in using a catalyst. Now, further experimentation disclosed that the dealkylation of alkylated cyclopentane reached a maximum selectivity of 33% approximately. In other words, of the total amount of the alkylated cyclopentane reacted, about ⅓ of the reaction products were cyclopentane.

In the accompanying drawing we present a graph showing the relationship between yields of cyclopentane and the reaction temperature during thermal cracking of the methyl cyclopentane. It is clear from the curve that the preferred temperature range is from 920° F. to 970° F., and 960° F. is the optimum temperature.

We have found that good results are obtained by operating within the following range of conditions:

| | |
|---|---|
| Temperature | Above 850° to about 1000° F. (900° to 980° F. preferred) |
| Pressure | 1000–5000 lbs./sq. in. |
| Cu. ft. of hydrogen per volume of oil | 600–5000 cu. ft. to 1 bbl. |
| Contact time | 0.5 to 3 hours |

Cyclopentane has a high blending value as determined by the known test designated the A. F. D.–3c test which is a test designed by Committee on Fuel Research, Aviation Fuel Division, to evaluate aviation gasoline by determining the so-called indicated mean effective pressure. In this test, cyclopentane had, according to the test, in a 25% blend with a 100 octane number (A. S. T. M.) base, a blending value of 370 when the cyclopentane was prepared from a naphtha fraction and therefore was somewhat impure, but had a blending value of 500 when the said cyclopentane was used in pure state in the proportions indicated in the said 100 octane number base gasoline. In these tests, the base gasoline was 50% virgin gasoline and 50% of an alkylate formed from butene and isobutane by the known alkylation method.

If a catalyst is used, we prefer to use a metal oxide mixture, such as $MnO_2$ and $CuO$ on a base such as magnesium oxide. Thus, we may use a catalyst containing 85 weight per cent MgO, 5% CuO and 10% MnO$_2$. Other mixtures may be employed.

To recapitulate briefly, our process relates to improved methods of producing cyclopentane by dealkylation of alkyl cyclopentanes, and in its essence it involves treating a substantially pure alkylated cyclopentane or a naphtha containing substantial amounts of these compounds at elevated temperatures and pressures, thermally or in the presence of a suitable catalyst. The utility of the process resides in the fact that the cyclopentanes obtained are very valuable blending agents particularly useful in the manufacture of aviation gasoline.

Numerous modifications of our invention will appear to those who are skilled in this art.

What we claim is:

1. The dealkylation of alkylated cyclopentanes to produce cyclopentane which comprises subjecting the alkylated cyclopentane to thermal treatment in a reaction zone at temperatures of from about 900° to 980° F. and elevated pressures.

2. The method set forth in claim 1 in which a catalyst containing a major portion of magnesium oxide, a minor portion of copper oxide, and a minor portion of manganese dioxide is used.

3. The dealkylation of methyl cyclopentane which comprises heating the methyl cyclopentane to a temperature above 900° F. but below 1000° F. while maintaining a superatmospheric pressure on the said methyl cyclopentane and permitting the latter to remain at the temperature and pressure stated until the desired conversion occurs.

4. The method of claim 3 in which added hydrogen is present during the reaction.

5. The method of claim 1 in which added hydrogen is present during the reaction.

6. The method of forming cyclopentane which comprises heating methyl cyclopentane to a temperature of from about 900° to 980° F. under superatmospheric pressure and in the presence of added hydrogen.

RALPH M. HILL.
HOWARD G. CODET.